US007042525B1

(12) United States Patent
Yu

(10) Patent No.: US 7,042,525 B1
(45) Date of Patent: May 9, 2006

(54) VIDEO INDEXING AND IMAGE RETRIEVAL SYSTEM

(75) Inventor: Hong Heather Yu, Plainsboro, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 593 days.

(21) Appl. No.: 09/611,133

(22) Filed: Jul. 6, 2000

(51) Int. Cl.
*H04N 5/14* (2006.01)
*H04N 7/12* (2006.01)

(52) U.S. Cl. .................................. 348/700; 375/240.26
(58) Field of Classification Search ................ 348/595, 348/700; 386/53; 375/240.08, 240.01, 240.19, 375/240.21, 240.26
See application file for complete search history.

(56) References Cited

U.S. PATENT DOCUMENTS

| | | | | |
|---|---|---|---|---|
| 5,245,436 A | * | 9/1993 | Alattar | 348/595 |
| 5,477,276 A | * | 12/1995 | Oguro | 348/595 |
| 5,508,750 A | * | 4/1996 | Hewlett et al. | 348/558 |
| 5,911,008 A | * | 6/1999 | Niikura et al. | 382/236 |
| 6,061,471 A | * | 5/2000 | Coleman, Jr. | 382/173 |
| 6,327,390 B1 | * | 12/2001 | Sun et al. | 382/235 |
| 6,449,392 B1 | * | 9/2002 | Divakaran et al. | 382/235 |
| 6,459,733 B1 | * | 10/2002 | Yokoyama et al. | 375/240.12 |
| 6,477,269 B1 | * | 11/2002 | Brechner | 382/165 |
| 6,493,042 B1 | * | 12/2002 | Bozdagi et al. | 348/700 |
| 6,542,619 B1 | * | 4/2003 | Jafarkhani et al. | 382/100 |

OTHER PUBLICATIONS

Science Direct Search Results, pp. 1-2.*
Amara Graps; An Introduction to Wavelets; 1995; Institute of Electrical and Electronics Engineers, Inc.; pp. 1-18.
Alex Nicolaou; A Wavelet Wading Pool; 1996; pp. 1-8.
Joshua Altmann; Wavelet Basics; 1996; Surfing the Wavelets; pp. 1-2 and 1-6.
Joshua Altmann; Signal Processing: "A Historical Perspective"; 1996; Surfing the Wavelets; pp. 1-2 and 1-8.
Joshua Altmann; Non-Stationary Signal Analysis; 1996; Surfing the Wavelets; pp. 1-2 and 1-2.
Yu/Wolf; A Hierarchical Multiresolution Video Shot Transition Detection Scheme; Jul./Aug. 1999; Computer Vision and Image Understanding vol. 75, Nos. 1/2; pp. 196-213.

(Continued)

*Primary Examiner*—Vu Le
*Assistant Examiner*—Dave Czekaj
(74) *Attorney, Agent, or Firm*—Harness, Dickey & Pierce, PLC

(57) ABSTRACT

A video segmentation system generates an S-distance measurement that is a representation of the similarity between adjacent frames of a video sequence. The video segmentation system employs frequency decomposition of a direct current (DC) luminance signal of a compressed video sequence. High and low frequency component signatures are generated from a frequency-decomposed signal using wavelet transformation. A cut detector identifies cut transitions from the low frequency component signature. A fade detector identifies fade transitions the high frequency component signature. A dissolve transition detector employs a double frame differencing algorithm to identify dissolve transitions. A video retrieval system likewise generates an S-distance between a query image and a database image. The video retrieval system employs the low and high frequency component signature to generate the S-distance measurement of the similarity between the query image and the database image. The results of the S-distance measurement allow browsing and searching of the similar database images.

12 Claims, 8 Drawing Sheets

OTHER PUBLICATIONS

Robi Polikar; Fundamental Concepts & An Overview of the Wavelet Theory; The Wavelet Tutorial Part 1; pp. 1-14.

Robi Polikar; Fundamentals: The Fourier Transform and the Short Term Fourier Transform; The Wavelet Tutorial Part 2; pp. 1-16.

Robi Polikar; Multiresolution Analysis & The Continuous Wavelet Transform; The Wavelet Tutorial Part III; pp. 1-26.

Robi Polikar; Multiresolution Analysis: The Discrete Wavelet Transform; The Wavelet Tutorial Part IV; pp. 1-9.

Yu/Wolf; Multi-resolution video segmentation using wavelet transformation; Princeton University, Princeton.

Multi-level Data Hiding for Digital Image and Video; Panasonic Information and Networking Technologies Lab.

Yu/Bozdagi/Harrington; Feature-based Hierarchical Video Segmentation.

Torrence/Compo; Wavelet Analysis, Introduction; A Practical Guide to Wavelet Analysis, With significance and confidence testing; pp. 1 and 1-2.

Torrence/Compo; Wavelet Analysis, Wavelets; A Practical Guide to Wavelet Analysis, With significance and confidence testing; pp. 1 and 1-3.

Hong Heather Yu; A wavelet-base invariance for automatic video indexing and other applications; Panasonic Information and Networking Technology Lab.

* cited by examiner

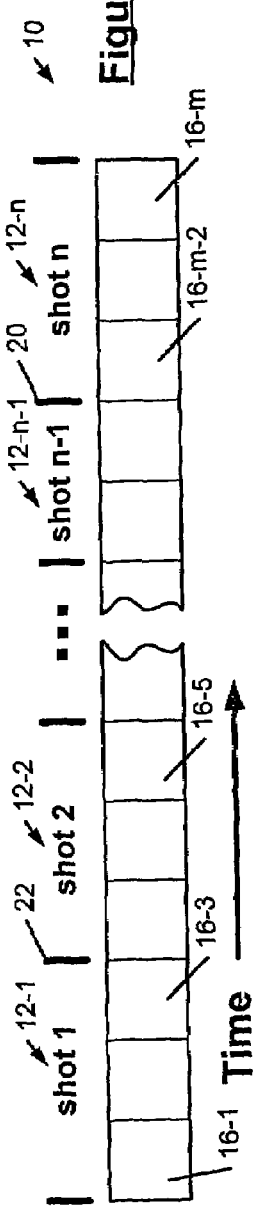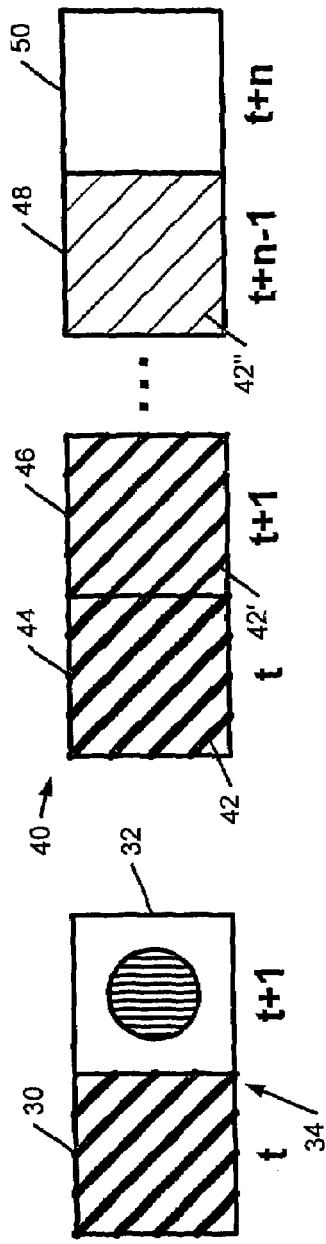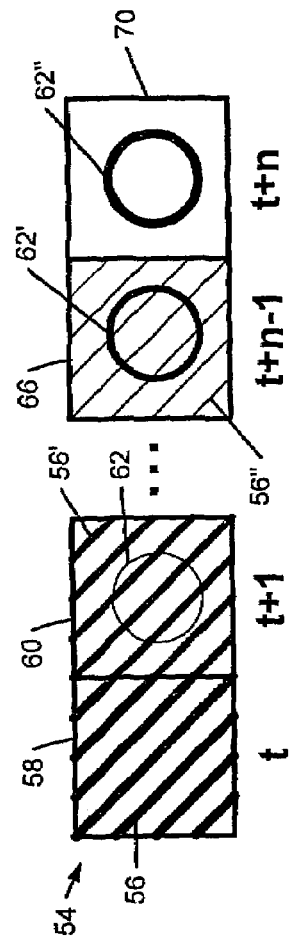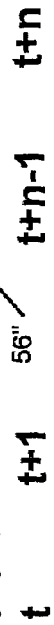

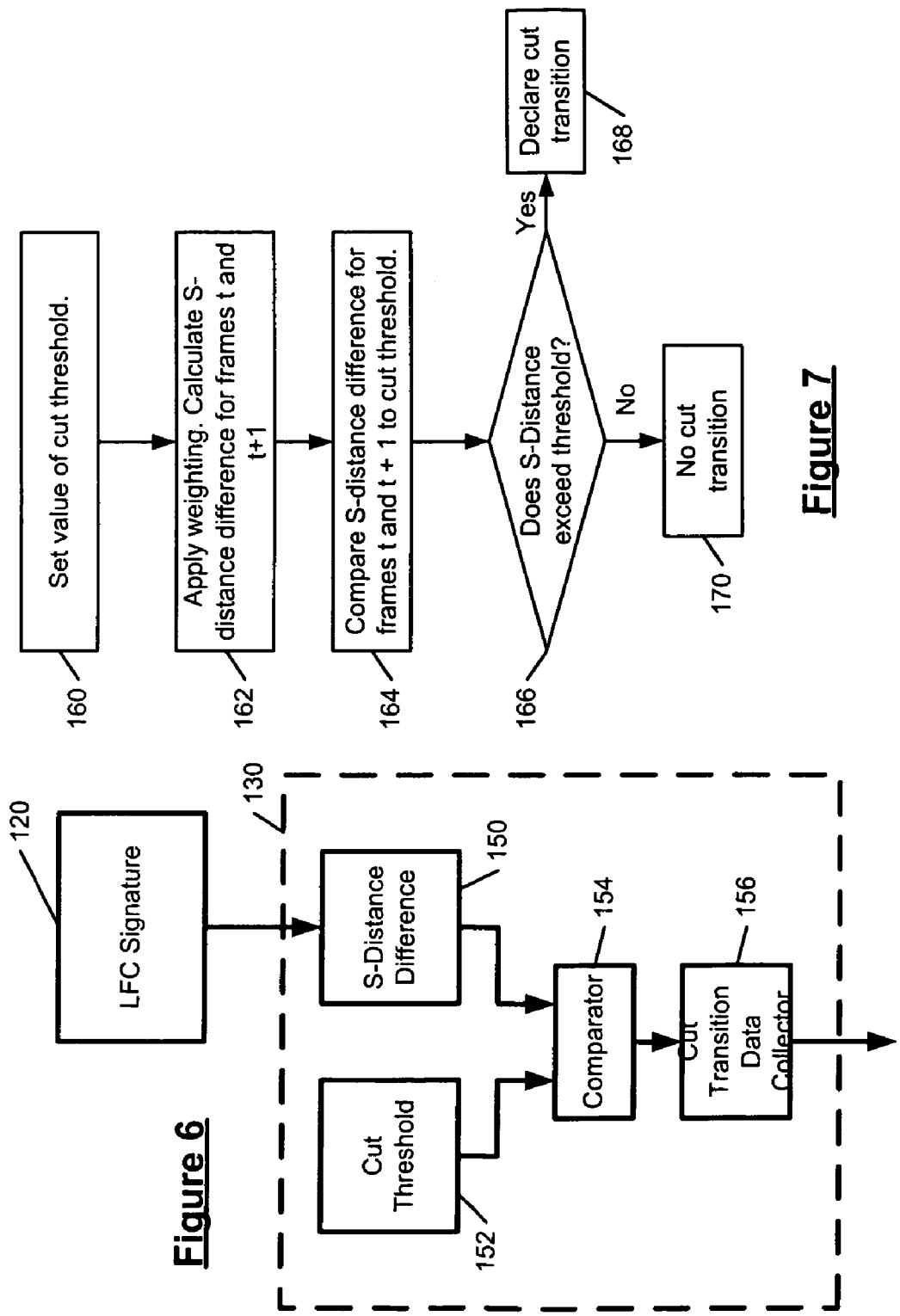

VIDEO INDEXING AND IMAGE RETRIEVAL SYSTEM

BACKGROUND AND SUMMARY OF THE INVENTION

The present invention relates generally to video signal processing. More particularly, the invention relates to a video indexing and image retrieval system.

Over the last few years, there has been a dramatic increase in available bandwidth over high-speed networks. At the same time, computer manufacturers improved the storage capacities of hard drives on personal computers, and improved the speed of the system bus and the motherboards that access the hard drives. The quality and efficiency of data compression algorithms has likewise improved information transmission efficiency and access rates—particularly with respect to video data.

One of the most important tasks of a database manager is to provide easy and intuitive access to data. This task can be particularly difficult when a user would like to search for images or other visual data such as video segments. Browsing and searching for data is one useful way that the Internet allows users to access related Internet pages rapidly and intuitively through text-based searches.

To allow the searching of visual data, an image retrieval system must be able to emphasis the similarity of a query image with images or frames of video stored in a database. There are several ways that a user may provide a query image. For example, users may have a rough idea of an image that they are looking for. The user may develop a simple sketch of an image by hand and a scanner can be used to upload the sketch or drawing software can be used. A photo of the image or a similar image can be used to find other similar images in the database.

An image search engine must be able to generate a measurement of the similarity between the query image and database images so that the user is presented with a list of the most relevant database images to the least relevant images. The image search engine associated with the image retrieval system must be able to look for similarities between significant features of the query sketch or image and the database images while ignoring minor detail variations. In other words, the image search engine must measure the visual similarity between the query image and the database images invariantly.

When searching the video sequences, it would be inefficient for the image retrieval system to compare the query image to every frame of the video sequence. A video sequence typically contains one or more shots. A shot is a sequence of related frames that are taken by one camera without interruption. To avoid the inefficiency, the image database manager must take the time to segment the shots and identify a key frame to represent the shots. To simplify this problem, it is desirable to perform video segmentation and key frame identification automatically.

A first step towards automatic video indexing is the ability to identify both abrupt transitions and gradual transitions. An abrupt transition is a discontinuous transition between two images and is also referred to as a cut transition. Gradual transitions include fade, dissolve, and wipe transitions. When an image gradually disappears into black or white or gradually appears from black or white, a fade transition occurs. When an image gradually disappears at the same time that another image gradually appears, a dissolve transition occurs. When a first image gradually blocks a second image, a wipe transition occurs. Gradual transitions are composite shots that are created from more than one shot.

A shot transition detector must be sensitive to both abrupt transitions and gradual transitions to be successful in an automatic video indexing system. The shot transition detector should also be insensitive to other changes. In other words, the shot transition detector should ignore small detail changes, image motion and camera motion. For example, panning, zooming and tilting should not significantly impact the query results.

Conventional video retrieval systems have employed several different types of cut transition detection techniques including histogram difference, frame difference, motion vector analysis, compression difference, and neural-network approaches. Frame differencing detection systems are extremely sensitive to local motion. Histogram detection systems successfully identify abrupt shot transitions and fades, but work poorly on gradual transitions such as wipe and dissolve. Motion vector detection systems require extensive computations that are prohibitive when large image databases are used. Neural-network detection systems do not provide improved performance over the other cut detection systems. Neural-network detection systems require significant computations for the neural-network training process.

Additional algorithms have been proposed that address gradual transitions such as fade, dissolve, and wipe transitions. Edge tracking systems measure the relative values of entering and exiting edge percentages. Edge tracking systems are able to correctly identify less than 20% of gradual transitions. Edge tracking systems require a motion estimation step to align consecutive frames which is computationally expensive. The performance of the edge tracking system is highly dependent upon the accuracy of the motion estimation step. Chromatic scaling systems assume that fade in transitions and fade out transitions are to and from black only. Chromatic scaling systems also assume that both object and camera motion are low immediately before and after the transition period.

A video segmentation system according to the invention includes a video source that provides a video sequence with a plurality of frames. The video segmentation system generates an S-distance measurement between adjacent frames of the video sequence. The S-distance measurement gauges the similarity between the adjacent frames.

A frequency decomposer that preferably employs wavelet decomposition generates a low frequency and a high frequency signature for each frame. A cut detector identifies cut transitions between two adjacent frames using the low frequency signature. A cut detector generates a difference signal between coefficients of the low frequency signature for adjacent frames and compares the difference signal to a threshold. If the difference signal exceeds the threshold, a cut transition is declared.

After identifying the cut transitions, the video segmentation system according to the invention employs a fade detector that identifies fade transitions using the high frequency signatures for frames located between the cut transitions. The fade detector includes a summing signal generator that sums the coefficients of the high frequency signature for each frame and compares the sum signal to a linear signal which is an increasing function for fade in and a decreasing function for fade out. A dissolve transition detector employs the high frequency signature to identify potential dissolve transitions. A double frame difference generator confirms the dissolve transitions. As can be appreciated, the video segmentation system according to the invention dramatically improves the identification of abrupt and gradual transitions. The video segmentation system achieves segmentation in a computationally efficient manner.

An image retrieval system according to the invention also employs an S-distance measurement to compare a query image to images located in a database. The S-distance measurement is used to allow a user to search and browse in a manner similar to text-based systems provided by the Internet.

BRIEF DESCRIPTION OF THE DRAWINGS

FIG. 1 illustrates a video sequence that includes a plurality of shots;

FIG. 2 illustrates multiple frames of a video sequence that are associated with a cut transition;

FIG. 3 illustrates multiple frames of a video sequence that are associated with a fade transition;

FIG. 4 illustrates multiple frames of a video sequence that are associated with a dissolve transition;

FIG. 6 is a functional block diagram illustrating a cut transition detector of FIG. 5 in further detail;

FIG. 7 is a flow chart diagram for the cut transition detector of FIG. 6;

DETAILED DESCRIPTION OF THE PREFERRED EMBODIMENTS

Figure 5:
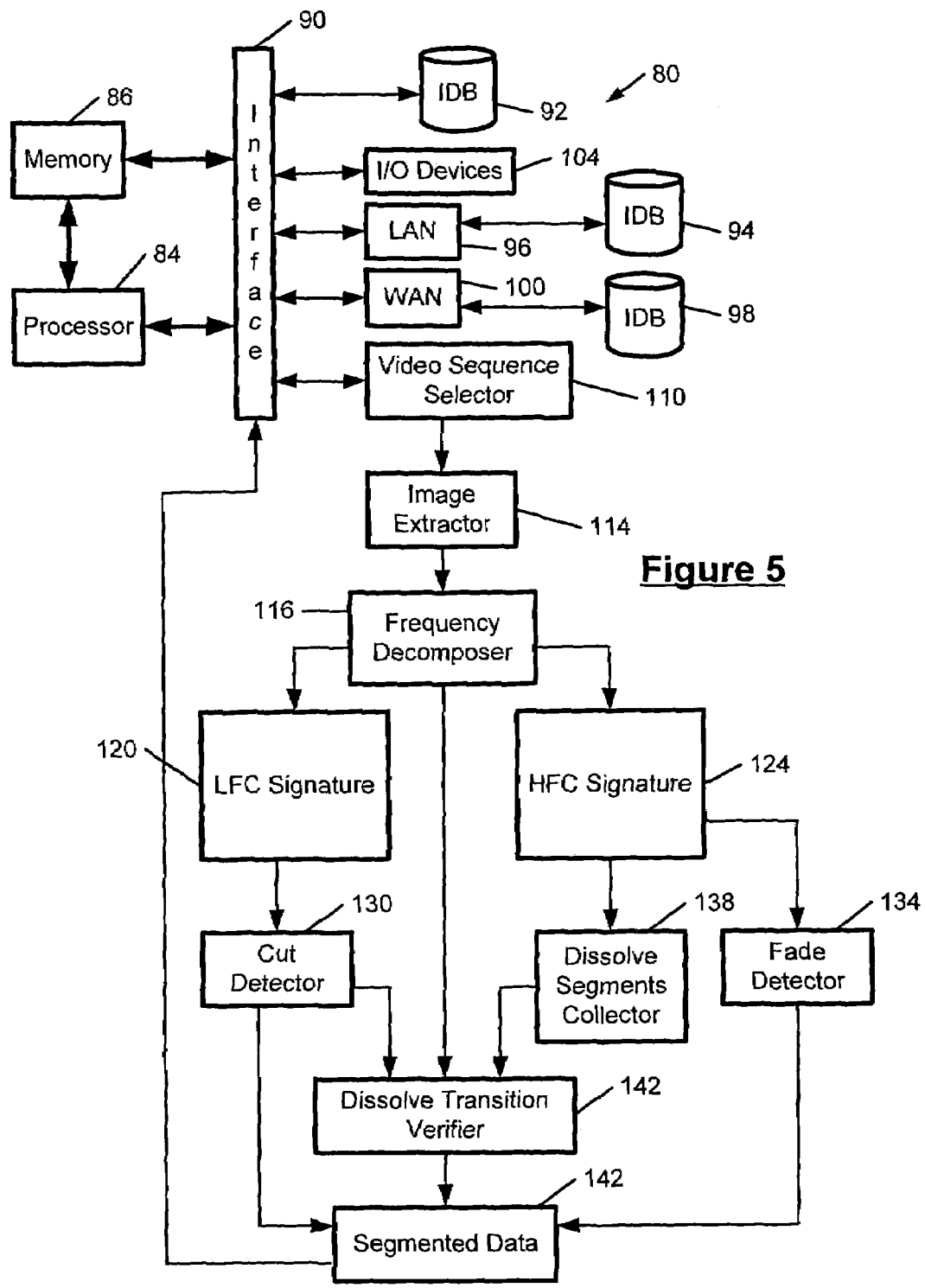
FIG. 5 is a functional block diagram of an automatic video indexing system according to the invention.

Referring to FIG. 1, a video sequence 10 is illustrated and includes a plurality of shots 12-1 to 12-n each including one or more frames 16-1 to 16m. The video sequence 10 includes n shots and m frames. An automatic video indexing system according to the invention is preferably capable of identifying both abrupt and gradual transitions between the n shots 12. After identifying the transitions between the n shots, a key frame can be selected for each shot 12 for video indexing, retrieval and other uses. The key frame can be a first frame in the shot, a middle frame or a combination of frames. Not all transitions between the n shots are easy to identify. For example, a transition between shot n−1 and shot n is a cut transition 20. A transition between shot 1 and shot 2 is a dissolve transition 22.

FIGS. 2–4 illustrate frames associated with both abrupt and gradual shot transitions. Referring now to FIG. 2, a first frame 30 of a video sequence starting at time t is followed by a second frame 32 starting at time t+1. Because of the abrupt transition between the frames 30 and 32, a cut transition is designated at time t+1(identified at 34) in FIG. 2.

FIG. 3 illustrates n frames of a fade out transition 40. Frame 44 occurs at time t and an image is readily distinguishable. Frame 46 occurs at the time t+1 and the visibility of image 42' is somewhat reduced relative to the image 42 in frame 44. At time t+n−1, the visibility of the image 42" is further reduced until at time t+n, the image 42 generally disappears into a single color, such as black or white. A fade in transition would be accomplished in reverse.

Referring now to FIG. 4, a dissolve transition 54 is illustrated and includes n frames. At time t, the visibility of an image 56 in frame 58 is relatively high. At time t+1, the visibility of the image 56' in frame 60 is reduced and a second image 62 becomes visible and has a relatively low visibility. At time t+n−1, the visibility of image 56" in frame 66 has decreased and the visibility of the image 62' has increased. At time t+n, the image 56 in frame 70 has disappeared and the visibility of the image 62" has increased.

Referring now to FIG. 5, an automatic video indexing system 80 for detecting abrupt and gradual transitions is illustrated. The automatic video indexing system 80 includes a processor 84 that is connected to memory 86 and an input/output interface 90. The memory 86 includes read only memory (ROM), random access memory (RAM), optical storage, hard drives, and/or other suitable storage. The automatic video indexing system 80 includes a source of video sequences such as a local video (image) database 92 or distributed video (image) databases such as a video (image) database 94 that is available through a local area network (LAN) 96 or a video (image) database 98 that is available through a wide area network (WAN) 100 which can be connected to the Internet. The automatic video indexing system 80 also includes input/output (I/O) devices 104 such as a keyboard, a mouse, one or more displays, an image scanner, a printer, and/or other I/O devices.

A video sequence selector 110 allows the user to select one or more video sequences 10 that may be stored in the video (image) databases 92, 94 and/or 98. Video sequence selection can be performed in a conventional manner through dialog boxes, which are navigated using mouse and/or keyboard selections. An image extractor 114 extracts a thumbnail direct current (DC) image for each frame of a selected video sequence. A frequency decomposer 116 is connected to the image extractor 114 and generates a frequency domain decomposition of each thumbnail DC image. The frequency decomposer can employ fast Fourier transform (FFT), discrete cosign transform (DCT), discrete Fourier transform (DFT), or wavelet transformation. Due to the computational efficiency of wavelet transforms such as Haar wavelet transforms, wavelet transformation is preferred.

When Motion Picture Experts Group (MPEG) video sequence sources are employed, they typically have a frame size of 512 by 512 pixels or larger. Generally the DC image is generated for 8 by 8 pixel blocks. A typical thumbnail MPEG image is 512/8 by 512/8 or 64 by 64 pixel blocks or larger. Decomposition of the MPEG thumbnail frame images using wavelet transforms has been found to be a sufficient input for generating high and low frequency domain components. This technique is advantageous since the thumbnail DC-image is much easier to extract from the MPEG video as compared to AC coefficients. By employing only the thumbnail DC components, lower computational time is required.

A low frequency component (LFC) signature generator 120 generates a LFC signature for each image. A high frequency component (HFC) signature generator 124 generates a HFC signature. In one embodiment, wavelet transformation is employed to generate the LFC and HFC signatures. The HFC and LFC signatures are generated as follows:

F is a representation of the host content $f$. F' is a function of F after processing such as compression or blurring. If automatic video indexing and image retrieval are desired, then the following need to be identified.

$$\frac{dF}{dt} = 0 \text{ or } F(t+1) - F(t) = 0$$

for video segmentation; and $F(\mathbf{q})-F(f_n)=0$ for retrieval of query image $\mathbf{q}$ from the database containing images $f_1, \ldots f_n \cdots f_N$.

$\tilde{f}$ represents a wavelet transform of $f$. $\tilde{f}'$ is the image $\tilde{f}$ in the wavelet domain with the small coefficients set to zero. Studies on visual data compression indicate that visually $\tilde{f}'-\tilde{f}\to 0$ when the small coefficients of the wavelet transformation of image $f$ are discarded. Suppose $F(\tilde{f}')$ is a feature extracted from $\tilde{f}'$ that invariantly preserves the visual content of $f$. Then visually we have $F(\tilde{f}')-F(\tilde{f})\to 0$. F can therefore be used as a discriminant function such that $F(\tilde{f}'_b)-F(\tilde{f}'_a) \geqq F(\tilde{f}_b)-F(\tilde{f}_a)$—where $f_a$ and $f_b$ are two different images (frames) that are visually different For video segmentation and image retrieval, the overall content change between two images or two video frames needs to be measured. The measurement should reflect the overall structures of two images or frames. S-distance is a measurement of the distance between two images or frames in the wavelet domain. S-distance gives a measurement of how many significant LFCs and/or HFCs of two images are in common. As a result, S-distance provides a good measurement on the overall similarities and/or differences between two images or frames and can be used for browsing and searching images as will be described further below.

$V_t(t\in[0,n])$ represents a frame t of video sequence V and $f$ represents an image. $v^1_t$ and $v^2_t$ represent shot 1 and shot 2. The image size is X by Y. $I_t(x,y)$ is the intensity of the (x,y)th coefficient of frame t and I(x,y) to be the intensity of (x,y)th coefficient of image I where, $x\in[1,X]$, and $y\in[1,Y]$.

To define S-distance, wavelet transformation is performed on two images. For example, the two images can be the query and the target images for image retrieval or two consecutive frames for video segmentation. The wavelet coefficient of image $I_t(x,y)$ is denoted as $\tilde{I}_t(x,y)$. The LFC signature $S_L$ and the HFC signature $S_H$ of each frame/image are defined as follows:

$$S_L(I_t) = (\delta(\tilde{I}_t(x,y))) = \begin{pmatrix} \delta(\tilde{I}_t(0,0)) & \delta(\tilde{I}_t(1,0)) & \cdots \\ \delta(\tilde{I}_t(0,1)) & \ddots & \\ \vdots & & \ddots \end{pmatrix}, (x,y)\in V_{t_L}$$

for video frames and $$S_L(\mathcal{I}) = (\delta(\tilde{I}(x,y))) = \begin{pmatrix} \delta(\tilde{I}(0,0)) & \delta(\tilde{I}_t(1,0)) & \cdots \\ \delta(\tilde{I}(0,1)) & \ddots & \\ \vdots & & \ddots \end{pmatrix}, (x,y)\in \mathcal{I}_L$$

for images.

$$S_H(I_t) = (\delta(\tilde{I}_t(x,y))) = \begin{pmatrix} \delta(\tilde{I}_t(x',y')) & \delta(\tilde{I}_t(x'+1,y')) & \cdots \\ \delta(\tilde{I}_t(x',y'=1)) & \ddots & \\ \vdots & & \ddots \end{pmatrix}, (x,y)\in V_{t_H}$$

for video frames, and $$S_H(\mathcal{I}) = \delta(\tilde{I}_t(x,y))) = \begin{pmatrix} \delta(\tilde{I}_t(x',y')) & \delta(\tilde{I}_t(x'+1,y')) & \cdots \\ \delta(\tilde{I}_t(x',y'+1)) & \ddots & \\ \vdots & & \ddots \end{pmatrix}, (x,y)\in \mathcal{I}_H$$

for images where $\delta(\tilde{I}(x,y))=n$, when $\epsilon_{n-1}<\tilde{I}(x,y)\leqq\epsilon_n$, and n=0, 1, 2, ... $f_L(f_H)$ represents the low (high) frequency subband—so does $V_{t_L}(V_{t_H})$. Notice here that I(x,y) is the single channel of multi-channel intensity function. After finding F (the LFC and HFC signatures) which is the discriminate signature of $f$, which is also a feature extracted from $\tilde{f}'$, algorithms that utilize this feature can be used for video processing applications as described further below.

Referring back to FIG. 5, a cut transition detector 130 that is connected to the LFC generator 120 identifies the cut transitions in a video sequence. A fade detector 134 that is connected to the HFC generator 124 identifies starting and endpoints of the fade transitions in the video sequence. A dissolve segments collector 138 is connected to the HFC generator 124 and identifies potential starting and ending points of the dissolve transitions of the video sequence.

A dissolve transition verifier 142 confirms the existence of the potential dissolve transitions identified by the dissolve segments collector 138 using a double frame differencing (DFD) algorithm. A segmented data generator 142 collects the cut transition data, the fade transition data, and the dissolve transition data identified by the cut detector 130, the fade detector 134, and the dissolve transition verifier 142. The segmented data generator 142 transmits the transition data to the interface 90 for storage within the video databases 92, 94, 98, or for transmission to other computers or I/O devices 104.

Referring now to FIG. 6, the cut transition detector 130 is connected to the LFC generator 120 and includes an S-distance difference generator 150, a cut threshold generator 152, and a comparator 154. A cut transition data collector 156 collects the cut transitions for the video sequence. A smoothing filter (not shown) may be used on an output of the S-distance difference generator 150 or the comparator 154 if desired.

Referring to FIG. 7, the operation of the cut detector 130 is illustrated in further detail. In step 160, a value for the cut threshold is set. In step 162, the S-distance function difference is calculated.

To calculate S-distance, weighting functions are applied to the LFC and the HFC signatures. Then, the S-distance function difference is calculated for the frames of the video sequence. The S-distance difference is calculated for pairs of consecutive frames, such as frame t and frame t+1. S-distance measures the distance between two images or two consecutive frames of the video sequence by taking the difference between LFC and HFC signatures after weighting functions are applied:

$$S(t, t+1) = \xi_L S_L(t, t+1) + \xi_H S_H(t, t+1)$$

$$= \xi_L |S_L(t+1), S_L(t)| + \xi_H |S_H(t+1), S_H(t)|$$

$$= \xi_L |\Omega_L^{t+1} S_L(t+1) - \Omega_L^t S_L(t)| + \xi_H |$$

$$\Omega_H^{t+1} S_H(t+1) - \Omega_H^t S_H(t)|$$

where $\xi_L$, $\xi_H$, $\Omega_L$, and $\Omega_H$ are weighting functions.

When identifying cut sequences, the high frequency signature components and/or the weighting function $\xi_H$ are set to 0. For any consecutive frames, if $S(t,t+1) > \partial$ where $\partial$ is the cut threshold, then from frame t to frame t+1 (or alternatively $T_0=t$ to $T_N=t+1$) observes a cut transition, otherwise no cut transition is observed.

In step 164, the S-distance function difference for frames t and t+1 is compared to the cut threshold. If the S-distance function difference exceeds the cut threshold as determined at step 166, a cut transition is declared at step 168. If not, a cut transition is not declared at step 170. Additional pairs of frames for t+2, t+3, . . . , t+n are handled similarly.

Figure 8:
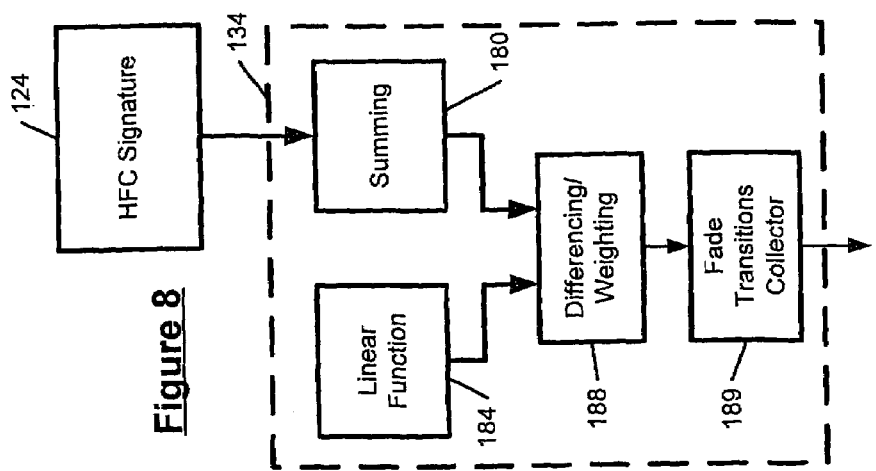
FIG. 8 illustrates a fade detector of FIG. 5 in further detail.

Referring now to FIG. 8, the fade transition detector 134 is illustrated in further detail. The fade transition detector 134 is connected to the high frequency component signal generator 124 and includes a summing signal generator 180, a linear function generator 184, and a comparing circuit 188. Because the cut transition detector 130 has identified cut transitions, the fade detector 134 analyzes only the subsequences of the video between two consecutive cuts.

The changing characteristics of the video frames within fade and dissolve transition can be modeled as:

$$E(t) = F(\upsilon_t^1)\eta(t) + F(\upsilon_t^2)(1-\eta(t)) + C, \forall t \in (t_0, t_N)$$

where E(t) is a characteristic function; $F(\upsilon_t^1)$, $F(\upsilon_t^2)$ represent unedited moving image sequence characteristic functions of two consecutive shots; $\eta(t)$ is a decreasing function with $\eta(t_0)=1$ and $\eta(t_n)=0$; C is the constant (or background) image such as text, label or logo which exists in all frames within a shot transition; and $t_0$, $t_N$ are the starting and ending points of a transition.

During a fade out, the second sequence is absent and $F(\upsilon_1^2)=0$ for $\forall t \in (t_0, t_N)$. In a fade in, $F(\upsilon_t^1)=0$ for $\forall t \in (t_0, t_N)$, i.e., $$E_{fade-out}(t) = F(\upsilon_t^1)(1-\eta(t)) + C$$

$$E_{fade-in}(t) = F(\upsilon_t^2)(1-\eta(t)) + C$$

During a dissolve, both $S_1(t)$ and $S_2(t)$ are not equal to zero.

$$E_{dissolve}(t) = F(\upsilon_t^1)\eta(t) + F(\upsilon_t^2)(1-\eta(t)) + C$$

Examples of the changing characteristic functions E(t) include the changing intensity function I(x,y,t) and the edge intensity function G(x,y,t).

$$E(x,y,t) = I_1(x,y,t)\eta(t) + I_2(x,y,t)(1-\eta(t)) + I_c(x,y)$$

$$E(x,y,t) = G_1(x,y,t)\eta(t) + G_2(x,y,t)(1-\eta(t)) + G_c(x,y)$$

where $I_1$ and $I_2$ define the intensity of the first and second unedited moving image sequences; $G_1$ and $G_2$ are the pixel intensity function of the corresponding edge image sequences of image sequences $I_1$ and $I_2$; $I_c$ and $G_c$ represent the pixel intensity function of the constant image and the constant edge image, respectively. Notice that in the above equation $G_k(x,y,t)=0$ when (x,y) is not an edge point. Hence only the edge points in the edge image will contribute to this characteristic function.

Figure 9:
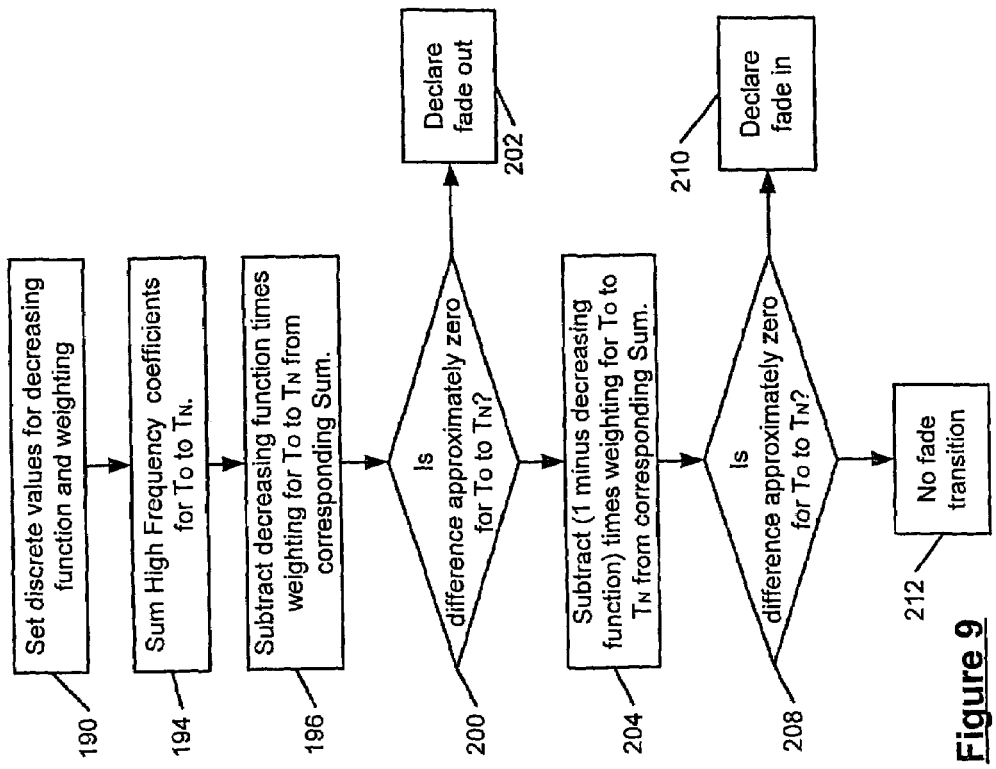
FIG. 9 is a flow chart diagram illustrating fade transition detection for the fade transition detector of FIG. 8.

Based on the number of frames in a shot to be analyzed for a fade transition, the values for a decreasing function and a weighting function used for fade transition detection are set by the linear function generator 184 in step 190 in FIG. 9. At step 194, the high frequency coefficients for each frame are summed. $\underline{S}_H(t) = |S_H(t)| = \Sigma_{(x,y)} \delta(\tilde{I}_t(x,y)), (x,y) \in V_{tH}$. At step 196, the difference circuit 188 generates a difference between the decreasing function output by the linear function generator 184 with the sum output by the summing signal generator 180 for each frame. If the difference is approximately zero for each frame in the shot sequence, as determined at step 200, i.e., if $\underline{S}_H(t) - \underline{S}_H(T_0)\eta(t) \approx 0$, $t \in [T_0, T_N]$, then a fade-out is declared at step 202. If not, the difference circuit subtracts one minus the decreasing function from the sum at step 204. If the difference is approximately equal to zero for each frame in the shot as determined at step 208, i.e., if $\underline{S}_H(t) - \underline{S}_H(T_N)(1-\eta)(t)) \approx 0$, $t \in [T_0, T_N]$ then a fade-in is declared at step 210. Otherwise, neither a fade-in transition nor a fade-out transition are declared at step 212.

Figure 10:
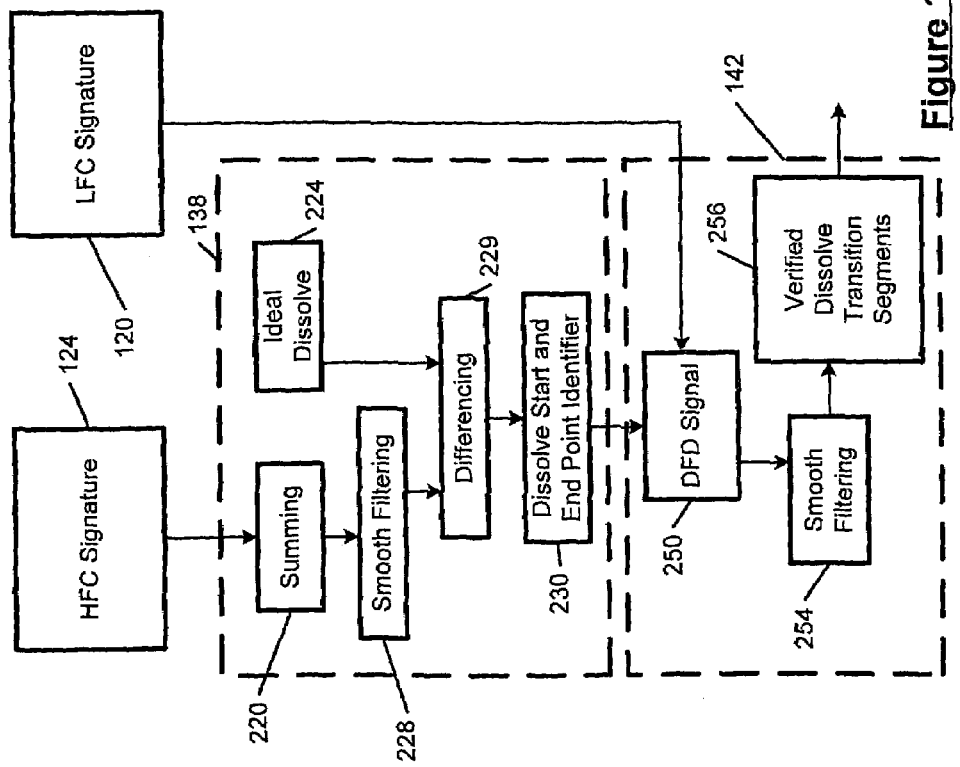
FIG. 10 is a functional block diagram illustrating a dissolve transition segments collector of FIG. 5 in further detail.

Referring now to FIG. 10, the dissolve transition segments collector 138 is illustrated in further detail. The dissolve transition segments collector 138 is connected to the HFC generator 124. The high frequency coefficients for each frame are summed, $\underline{S}_H(t) = |S_H(t)| = \Sigma_{(x,y)} \delta(\tilde{I}_t(x,y)), (x,y) \in V_{tH}$. An ideal dissolve signal generator 224 generates the ideal dissolve function that is a changing statistical function. A smoothing filter 228 smoothes the summed HFC. A difference circuit 229 generates a difference between the output of the ideal dissolve signal generator 224 and the filtered and summed HFC output. If the difference is approximately zero as determined at 230, i.e., if $\underline{S}_H(t) - \underline{S}_H(T_o)\eta(t) \approx 0$, $t \in [T_o, T_{N/2}]$ and $\underline{S}_H(t) - \underline{S}_H(T_O)(1-\eta(t)) \approx 0$, $t \in [T_{N/2}, T_N]$, then $T_O$ and $T_N$ are declared as potential starting and ending points of a dissolve. Experimental results show that the HFC more accurately predict fades and dissolves as compared to color histogram, frame differencing, and motion vector analysis. Generally $\underline{S}_H(t)$ of a dissolve transition is "U"-shaped with the center of the "U" being a local minima identifying a mid-point of a potential dissolve transition and local maxima on both sides thereof identifying starting and ending points of the potential dissolve transition.

Figure 11:
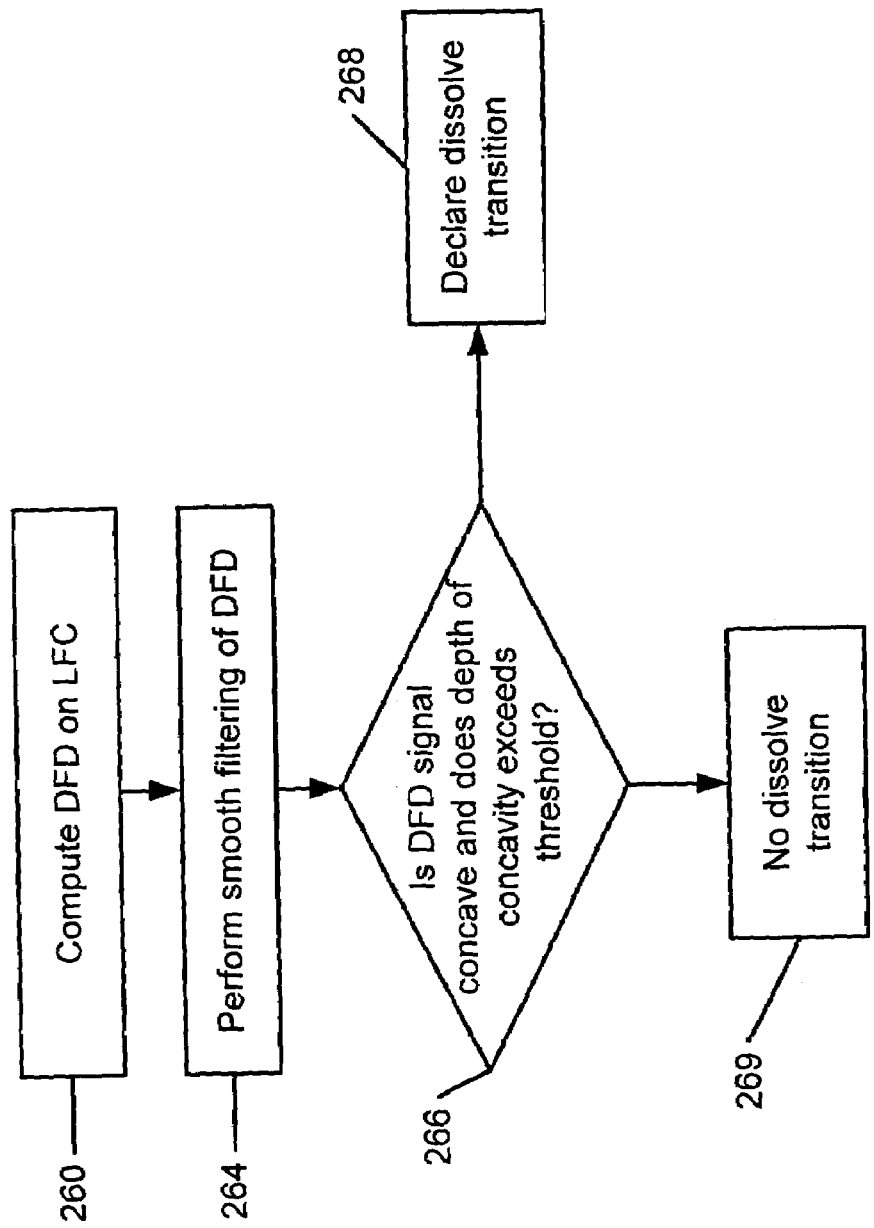
FIG. 11 is a flow chart diagram illustrating the operation of the dissolve transition verifier.

Referring now to FIGS. 10 and 11, the dissolve transition verifier 142 is illustrated in further detail. The dissolve transition verifier 142 is connected to the dissolve transition segments collector 138 and receives the potential starting and ending points of dissolve transitions therefrom. The dissolve transition verifier 142 is connected to the LFC signature 120 and includes a double frame difference (DFD) generator 250 which is connected to the output of the dissolve transition segments collector 138.

An ideal dissolve has a "V"-shaped intensity function and has no local motion or camera motion in the sequence. The change of intensity of the first shot has a negative slope and is linear. There exists a frame $i_k$ with its intensity $I(x,y,i_k)$ equal to the average intensity of the starting and ending frames $I(x,y,i_k)$ and $I(x,y,i_N)$) of the dissolve when N=2m+1. That is, $$I(x, y, i_k) = \frac{I(x, y, i_0) + I(x, y, i_N)}{2}.$$

(Note when N=2m (m is an integer), $i_k$ is then a pseudo frame.) The DFD of frame $i_d$ of a moving image sequence I is defined as the accumulation of a pixel by pixel comparison between this average and the intensity of frame $i_d$, where $i_d$ is a frame in a potential dissolve transition segment.

$$DFD(i_d) = \sum_{(x,y)} f\left(\left|\frac{I(x, y, i_0) + I(x, y, i_N)}{2} - I(x, y, i_d)\right|\right),$$

The dissolve transition verifier 142 further includes a smoothing filter 254 which smoothes the output of the DFD signal. A verified dissolve transition collector 256 stores the verified dissolve transition data for a video sequence.

Referring to FIG. 11, at step 260, the DFD signal generator 250 computes the DFD signal on the LFC signature for the starting and ending points provided by the dissolve segments collector 138. At step 264, the smoothing filter 254 filters the data provided by the DFD signal generator 250. At step 266, the slope of the DFD signal is used to identify whether the DFD signal is concave (i.e. if the DFD(t)–DFD$(T_0)\eta(t)\approx 0$, $t\in[T_0, T_{N/2}]$, and DFD(t)–DFD$(T_N)(1-\eta(t))\approx 0$, $t\in[T_{N/2}, T_N]$) and whether the depth of the concavity exceeds a threshold. If both are present, a dissolve transition is declared at step 208. If one or both are not present, then a dissolve transition is not declared at step 269.

As can be appreciated, the automatic video indexing system 80 automatically indexes video sequences with a high probability of identification of both abrupt and gradual shot transitions. Furthermore, a key frame can be selected from each shot for image retrieval and shot summary by selecting a first frame, an intermediate frame, or a combination of frames.

Figure 12:
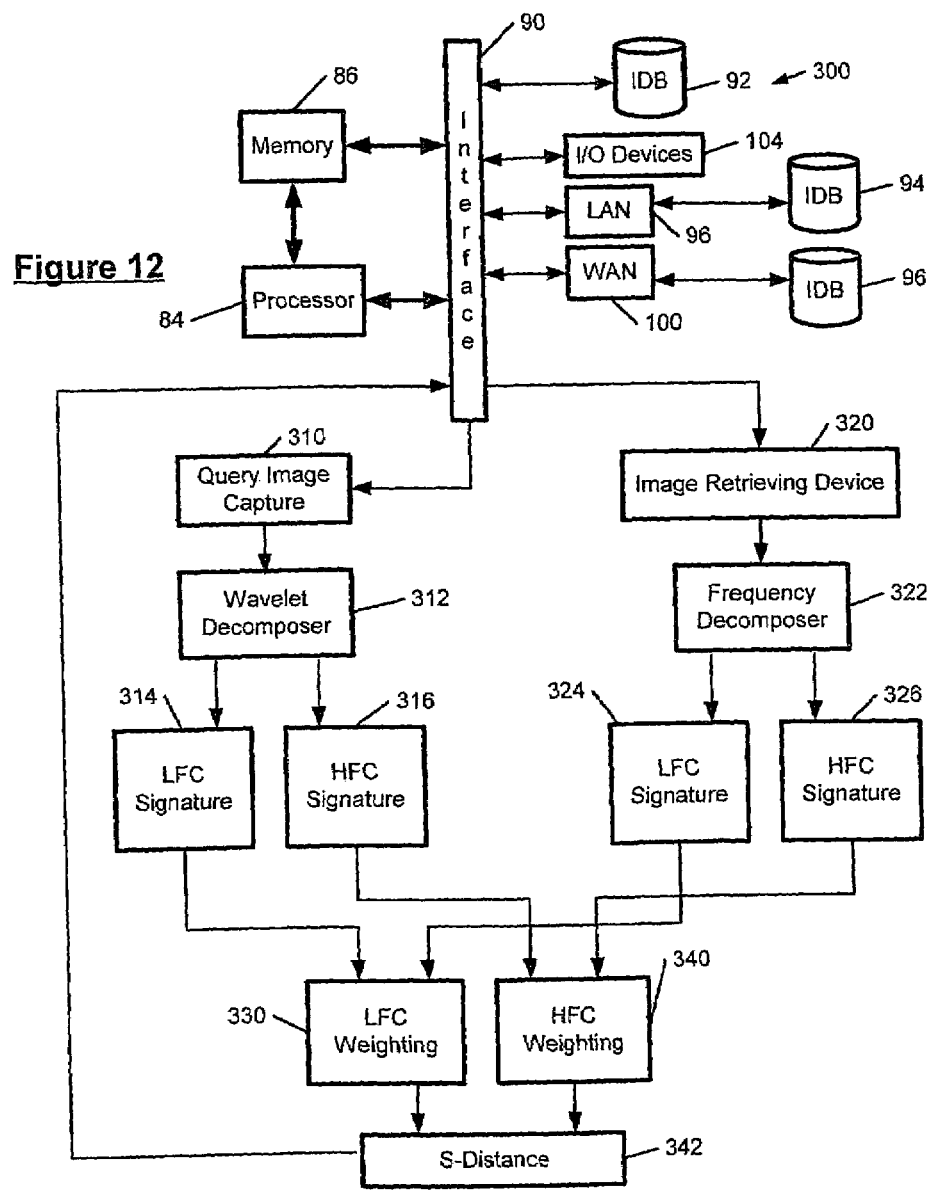
FIG. 12 is a functional block diagram of one embodiment of an image retrieval system.

Referring now to FIG. 12, an image retrieval system 300 is illustrated. Reference numbers from FIG. 5 have been utilized to identify similar elements in FIG. 12. The image retrieval system 300 includes a query image capture device 310 which employs I/O devices 104. The query image can be input using I/O devices 104 such as a scanner for capturing a photograph or sketch. Drawing software associated with processor 84 and memory 86 may also be used to input a sketch. Alternately, the query image can be selected on the Internet, input using portable storage media, stored on a hard drive or selected from the image databases 92, 94, and/or 96. Other suitable query image sources will be apparent to skilled artisans. The query image capture device 310 is connected to the frequency decomposer 322 which provides frequency decomposition of the query image using wavelet transformation, DFT, DCT, FFT, or other suitable frequency domain transformation. Preferably, however, wavelet decomposition using Haar transformation is employed.

The output of the frequency decomposer 322 is connected to the LFC generator 120 and the HFC generator 124. An image retrieving device 320 retrieves images for comparison to the query image from at least one of the image databases 92, 94, and/or 96. The image retrieving device 320 outputs the images to the frequency decomposer 322 which similarly performs wavelet transformation, DCT, DFT, FFT, or other suitable frequency domain transformation.

The output of the frequency decomposer 116 is input to the LFC generator 120 and the HFC generator 124. The output of the LFC generator 314 and 324 are input to a LFC weighting device 330. The output of the HFC generators 316 and 326 is input to a HFC weighting device 340. After suitable weighting is applied, an S-distance generator 342 generates the S-distance measurement.

The S-distance measurement performed on frames t and t+1 can be used on the query image and database image. S(t,t+1) is replaced by $S(Q, \mathcal{I}_n)$ where $Q$ represents the query image and $\mathcal{I}_n$ represents the nth image in the database.

$$S(Q, \mathcal{I}_n) = \xi_L S_L(Q, \mathcal{I}_n) + \xi_H S_H(Q, \mathcal{I}_n)$$
$$= \xi_L |S_L(Q), S_L(\mathcal{I}_n)| +$$
$$\xi_H S_H(Q), S_H(\mathcal{I}_n)|$$
$$= \xi_L \left|\Omega_L^Q S_L(Q) - \Omega_L^{(\mathcal{I}_n)}{}_n S_L(\mathcal{I}_n)\right| +$$
$$\xi_H \left|\Omega_H^Q S_H(Q) - \Omega_H \mathcal{I}_n S_H(\mathcal{I}_n)\right|$$

The images with the least S-distance measurement to the query image $Q$ can then be returned in order of highest to lowest similarity as retrieval results in a manner similar to text-based browsing and searching.

As can be appreciated, the query image is compared to multiple images from the image databases 92, 94, and/or 96 and the S-distance measurement defines the relative similarity between the query image and the database image. Subsequently, the processor 84 and memory 86 arranges the query results in order of highest to lowest similarity and outputs the query results to one of the I/O devices 104 for selection by the user.

Figure 13:
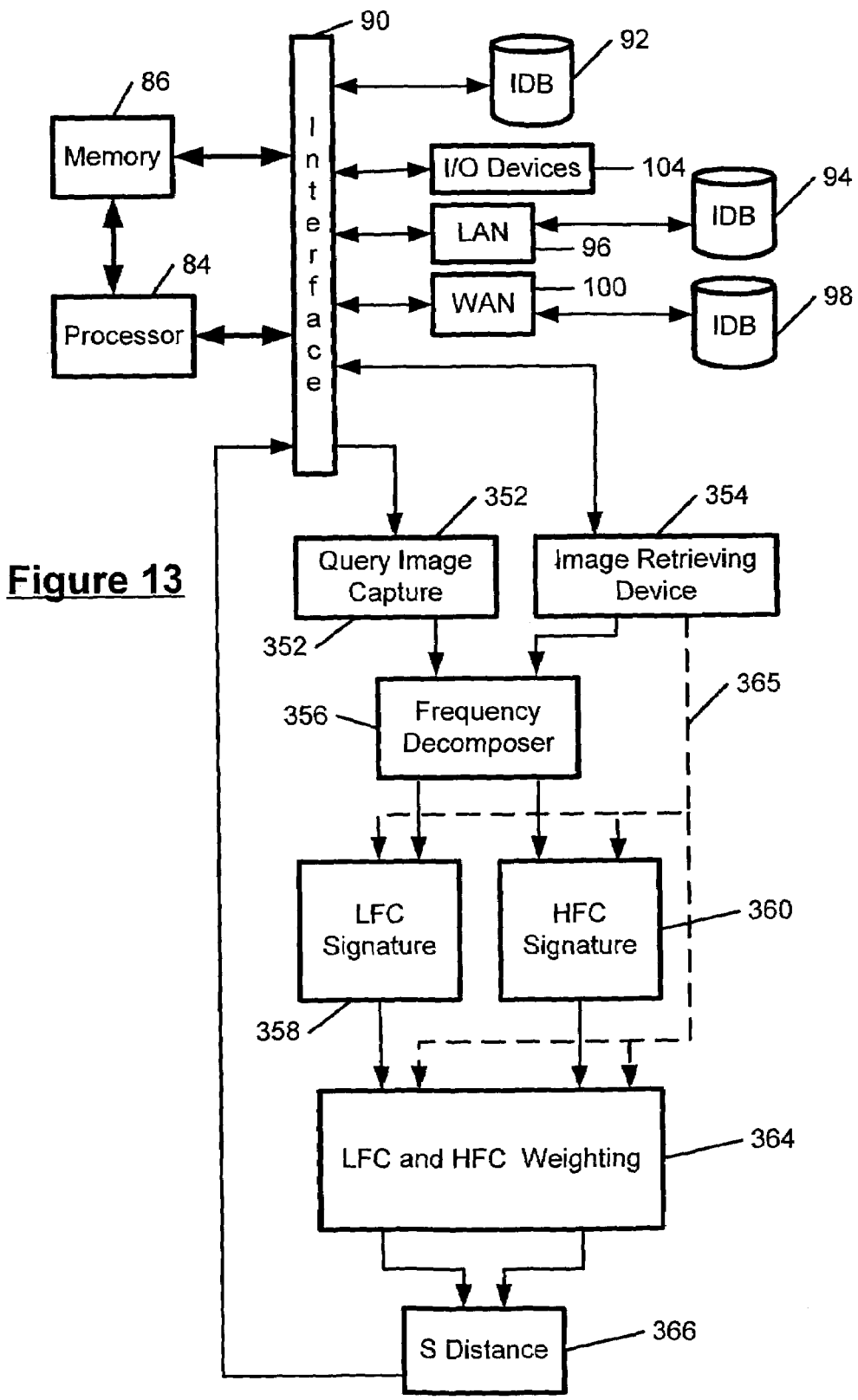
FIG. 13 is a functional block diagram of a second embodiment of the image retrieval system.

Referring now to FIG. 13, a second embodiment of the image retrieval system is illustrated at 350. A query image capture device 352 captures a query image as described above. An image retriever 354 retrieves images for comparison with the query image. Depending on how the image is stored, the output of the image retrieving device 352 is input to a frequency decomposer 356, to a LFC signal generator 358 and a HFC signal generator 360, to a LFC and HFC weighting device 364 as indicated by dotted line 365. Processing of the S-distance measurement is similar to that described above with respect to FIG. 12. By eliminating some of the processing on the database images, computational efficiency can be improved.

From the foregoing, it will be understood that the invention provides an image retrieval system that generates a list of possible database images that match a query image based upon the similarity between the database image and the query image. Skilled artisans can appreciate that while discrete functional blocks have been identified in FIGS. 5, 6, and 8, these functions can be combined into larger functional blocks which perform multiple functions. The image retrieval system allows large databases to be searched for images. Browsing and searching extensive image databases is dramatically simplified.

While the invention has been described in its presently preferred embodiments, it will be understood that the invention is capable of certain modifications and changes without departing from the spirit of the invention as set forth in the appended claims.

What is claimed is:

1. A video segmentation system comprising:
    a video source that provides a video sequence that includes a plurality of frames each including multiple pixels;
    a frequency decomposer connected to said video source that generates a low frequency signature for each of said plurality of frames and a high frequency signature for each of said plurality of frames, where the low frequency signature having a first set of x by y coefficients for each of said plurality of frames and the high frequency signature having a second set of x by y coefficients for each of said plurality of frames;

a cut detector connected to said video source and said frequency decomposer that identifies a cut transition between two adjacent frames using said low frequency signature;

a fade detector that identifies a fade transition using said high frequency signature for a sequence of adjacent frames of said video sequence that are located between said first and second cut transitions;

a linear signal generator that assigns a fade threshold value for each of said frames that are located between said first and second cut transitions;

a summing signal generator that provides a sum signal for each of said frames located between said first and second cut transitions by adding said second set of x by y coefficients in said high frequency signature; and a comparing circuit connected to said linear signal generator and said summing signal generator that compares said sum signal with said fade threshold value for each of said frames located between said first and second cut transitions and declares a fade transition when said sum signal and said fade threshold are approximately equal for each of said frames located between said first and second cut transitions.

2. The video segmentation system of claim 1 wherein said video sequence is in a compressed format, wherein each of said frames includes a plurality of blocks that include multiple pixels and wherein each of said blocks has a direct current (DC) luminance signal and an alternating current (AC) luminance signal.

3. The video segmentation system of claim 1 wherein said frequency decomposer employs at least one of wavelet decomposition, discrete Fourier transformation (DFT), and discrete cosine transformation.

4. The video segmentation system of claim 3 wherein said frequency decomposition employs wavelet decomposition using a Haar transform.

5. The video segmentation system of claim 1 wherein said cut detector includes:

a cut threshold generator that generates a cut threshold signal;

a difference signal generator connected to said frequency decomposer that generates a difference signal by comparing said first set of x by y coefficients for a first frame with said first set of x by y coefficients for a second frame that is adjacent said first frame; and a comparator connected to said cut threshold generator and said difference signal generator that identifies a cut transition between said two adjacent frames if said difference signal exceeds said cut threshold signal.

6. The video segmentation system of claim 5 wherein said difference signal generator applies a weighting function before calculating said differencing signal.

7. The video segmentation system of claim 1 wherein said linear function signal generator provides a decreasing linear signal to identify a fade out transition and an increasing linear signal to identify a fade in transition.

8. The video segmentation system of claim 1 further comprising:

a dissolve detector that identifies a dissolve transition using said low frequency signature and said high frequency signatures for adjacent frames of said video sequence located between said first and second cut transitions.

9. The video segmentation system of claim 8 wherein said dissolve detector includes:

a dissolve segments collector that identifies potential starting and end points of said dissolve transitions; and a dissolve transition verifier that verifies said potential start and end points.

10. The video segmentation system of claim 9 wherein said dissolve segments collector includes:

a summer that generates a sum signal based on said high frequency components;

a dissolve generator that generates a dissolve signal;

a difference generator that is connected to said summer and said dissolve generator and that generates a difference signal based on said sum signal and said dissolve signal; and a start and end identifier that is connected to said difference generator and that identifies said potential start and end points of said dissolve transition.

11. The video segmentation system of claim 10 wherein said dissolve segments collector includes:

a smoothing filter that is connected between said summer and said difference generator.

12. The video segmentation system of claim 11 wherein said dissolve transition verifier employs a double frame differencing algorithm on said potential start and end points.

* * * * *